UNITED STATES PATENT OFFICE.

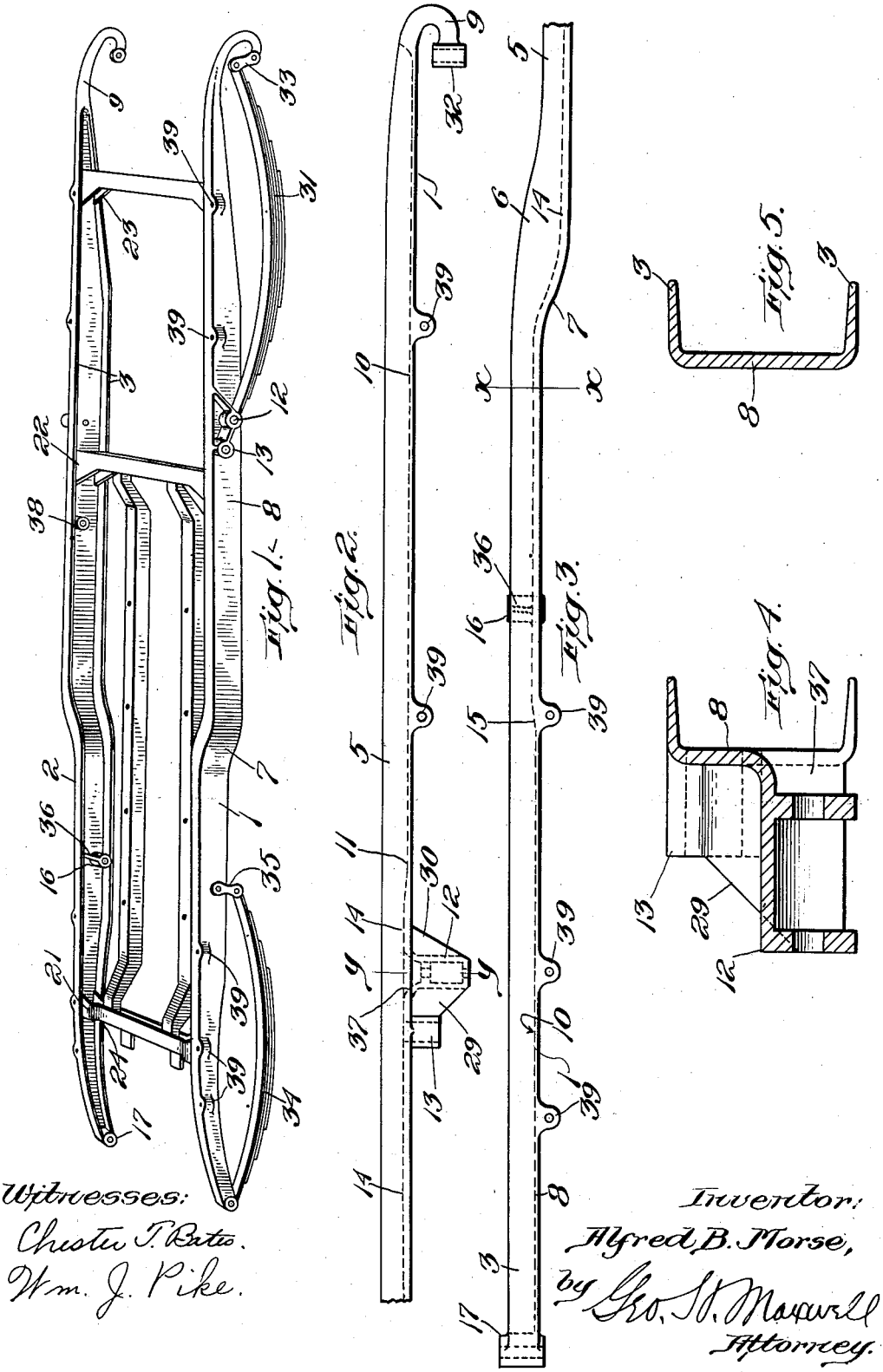

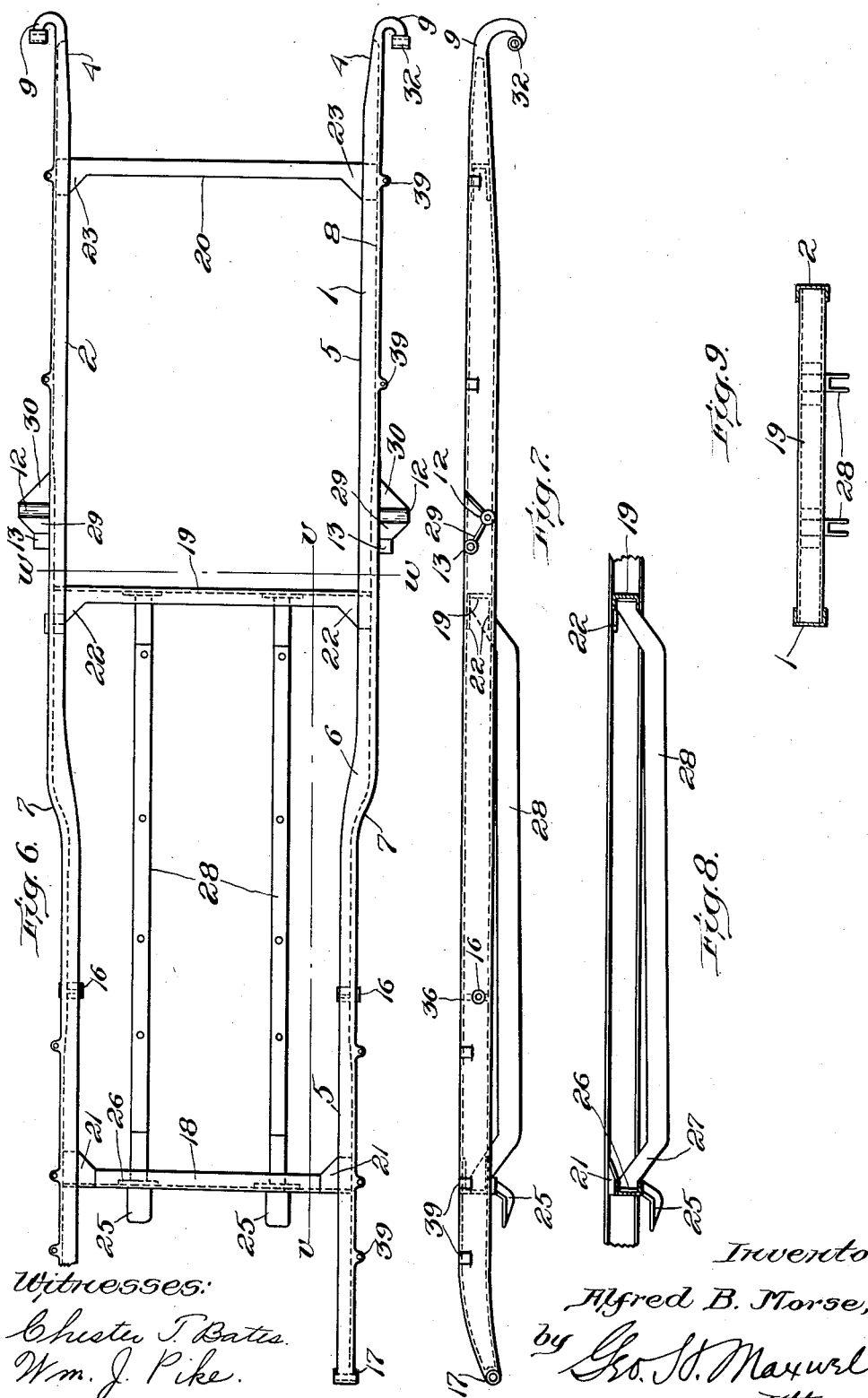

ALFRED B. MORSE, OF SOUTH EASTON, MASSACHUSETTS.

AUTOMOBILE-FRAME.

No. 835,547.  Specification of Letters Patent.  Patented Nov. 13, 1906.

Application filed May 7, 1906. Serial No. 315,486.

*To all whom it may concern:*

Be it known that I, ALFRED B. MORSE, a citizen of the United States, residing at South Easton, in the county of Bristol and State of Massachusetts, have invented an Improvement in Automobile-Frames, of which the following description, in connection with the accompanying drawings, is a specification, like letters on the drawings representing like parts.

My invention is a chassis or frame for an automobile.

One of the most difficult matters from a practical standpoint in building an automobile is to provide a frame of sufficient lightness capable of enduring indefinitely the severe and continuous strain and vibration to which it is subjected in the rapid travel of the automobile and the constant working of the engine. The frame must be light, and yet it must rigidly and unyieldingly support the heavy weight of all the superposed mechanism and other parts of the car. The problem is still more complicated because of the extreme length of the ordinary vehicle of this class. The result is that it has been considered heretofore necessary to build the frame of sheet-steel plate cut and bent to fit the various situations and parts, overlapping and riveted in various thicknesses and positions, thereby not only being expensive, but heavy and liable to loosen at the multitude of joints and also liable to spring or give at various critical points.

I have succeeded in eliminating all the above-mentioned objectionable features in the construction which constitutes my present invention and which will be explained more at length in the course of the following description, referring to the accompanying drawings, in which I have illustrated my invention.

In the drawings, Figure 1 is a perspective view of my improved frame. Figs. 2 and 3, taken together, represent in top plan one of the side beams of the frame. Figs. 4 and 5 are enlarged cross-sectional details taken, respectively, on the dotted lines *y y*, Fig. 2, and *x x*, Fig. 3. Fig. 6 is a top plan view of the frame. Fig. 7 is a side elevation thereof; and Figs. 8 and 9 are sectional views, respectively, on the lines *v v* and *w w*, Fig. 6.

My first object has been to eliminate as far as possible all plate metal, rivets, and joints and to provide a structure in which the parts mutually embrace and support each other and provide the requisite strength without the riveted struts, plates, and other cumbrous constructions which have heretofore been considered necessary. Instead of steel I employ Parson's manganese bronze, which is practically non-crystallizing in its composition and has great tensile strength and practically never fatigues. I have found it possible to cast the frame of this metal in the shape and arrangement of parts which are shown in the drawings. I provide opposite side bars 1 2, having inwardly-projecting flanges 3, comparatively narrow at their ends 4 and thence extending slightly wider at 5 and having considerable width at 6 adjacent an intermediate bend or curve 7. The vertical flange 8 of the side bars is coextensive with the bent ends 9, as best shown in Figs. 1 and 2, and thence extends in a comparatively thin web 10 to a point at 11 adjacent the spring-bearing 12 and rear brake-shaft bearing 13, where said flange 8 merges into a thicker web 14, which continues with considerable thickness, preferably uniform, beyond the widened portion 6 of the horizontal flanges 3 3 until it reaches, approximately, the point 15 just beyond the spring-boss 16, whence it continues as a narrow flange-web 10, the same as at the opposite end of the side bar, the end spring-boss 17 being formed integrally with the vertical flange 8 and the horizontal flanges 3 3, as best shown in Figs. 1, 3, and 7, thereby binding and bracing the same together to the best advantage.

Viewed in side elevation the flange 8 thickens gradually from its opposite ends to an intermediate point between said ends and the points 11 and 15, respectively, where the thicker web 14 begins. This construction not only distributes the metal to the best advantage, but distributes the strains and provides a coöperating bracing effect without necessitating any riveted plates or other applied braces or struts.

A front cross-rail 18, intermediate cross-rail 19, and rear cross-rail 20 are formed between the side bars 1 2, in which the gussets 21 22 23 are preferably formed integrally with the frame, said cross-bars being U-shaped in cross-section, as shown clearly in Figs. 7 and 8. The gussets 21 extend horizontally and merge downwardly at 24, so as to lower the intermediate portion of the cross-rail 18, which is provided on its under side with integral steps 25. In line with these steps are cast strengthening-bosses 26, which extend out laterally, as clearly shown in Fig. 6, and connect the upper and lower horizontal flanges of the rail 18, and from these extend integrally outward and downward at 27 subframe-rails 28, which are united at their opposite ends to the rails 19 in like manner, said rails being U-shaped in cross-section, as shown clearly in Fig. 9. The spring-boss 12 and rear brake-shaft bearing 13 are connected by a heavy integral web 29, extending obliquely upwardly and forwardly, and a similar integral web 30, extending obliquely upwardly and rearwardly from the boss 12. As I have located these strong resisting parts just beyond or within the end of the thick web portion 14 of the flange 8 and adjacent the integral gusset formation 22, where the intermediate cross-rail 19 joins and strengthens the side bars, the strains transmitted by the spring 31 are properly withstood. I have shown only one of said springs 31, as they constitute no portion of my invention, the solid neck portion 9 of the side bar being not only downwardly curved, but outwardly curved, as shown clearly in Figs. 2, 6, and 7, and terminating in a boss 32 for supporting said springs. At their opposite ends the side bars are provided with similar springs 34, secured pivotally by links 35 to the bosses 16. The bosses 16 extend integrally from the vertical flange 8 of the side rails and are connected by vertical transverse webs 36 to the horizontal flanges 3 of said side rails. As a further strengthening means I have deflected the lower portion of the flange 8 at 37, where it merges into the spring-boss 12, as shown clearly in Figs. 2 and 4. In the bar 2 I provide an integral boss 38 for the change-gear lever-shaft of the motor. At 39 I have provided holders for the fender-irons of the vehicle, and these, as well as the holders for the springs and all the gussets, bearings, and other parts, as already mentioned, are cast integrally with the rest of the frame in the most complete form of my invention.

In the steel construction previously employed, as already mentioned, it has been necessary to press the frame cold, and I have found that the straining of the metal at the corners has tended to crystallize and weaken the frame, and, moreover, on account of the bending or pressing it has been necessary to employ a steel low in carbon in order not to crack at the corners, and hence a steel could be used capable of withstanding only about fifty-four thousand pounds tensile strain, whereas I have succeeded in devising a construction of frame which is much lighter in weight and yet is very much stronger, being especially strong at the center beneath the dash or foot-room and in which the manganese bronze with a tensile strength of sixty-five thousand to seventy-five thousand pounds is used.

Having described my invention, what I claim as new, and desire to secure by Letters Patent, is—

1. An automobile-frame, having opposite side bars, each containing a vertical flange and horizontal flanges and having at their opposite ends means for supporting the adjacent ends of springs, and adjacent said opposite ends spring-bosses for sustaining the inner ends of said springs, the vertical flanges of said side bars having increased thickness in cross-section from a point at the rear of the rear spring-boss to a point adjacent the front spring-boss, all of said parts being cast integrally.

2. An automobile-frame, having opposite side bars, each containing a vertical flange and horizontal flanges and having at their opposite ends means for supporting the adjacent ends of springs, and adjacent said opposite ends spring-bosses for sustaining the inner ends of said springs, the vertical flanges of said side bars having increased thickness in cross-section from a point at the rear of the rear spring-boss to a point adjacent the front spring-boss, and the said horizontal flanges of said side bars being relatively narrow at their opposite ends and widened intermediate said ends between said spring-bosses, all of said parts being cast integrally.

3. An automobile-frame, having opposite side bars, each containing a vertical flange and horizontal edge flanges, said vertical flange increasing in thickness toward the intermediate length of said bar and having an intermediate bend or outward curve, and said horizontal edge flanges being comparatively narrow excepting adjacent said intermediate bend or outward curve, where they are wider, having their narrow edge sloping at an angle to said intermediate bend.

4. An automobile-frame, having opposite side bars, each containing a vertical flange and horizontal edge flanges, said vertical flange increasing in thickness toward the intermediate length of said bar and having an intermediate bend or outward curve, and said horizontal edge flanges being comparatively narrow excepting adjacent said intermediate bend or outward curve, where they are wider, having their narrow edge sloping at an angle to said intermediate bend, said vertical and horizontal flanges at the rear ends of said side bars converging together into a solid downwardly-curved spring-support.

5. An automobile-frame, having opposite side bars, each containing a vertical flange and horizontal edge flanges, said vertical flange increasing in thickness toward the intermediate length of said bar and having an intermediate bend or outward curve, and said horizontal edge flanges being comparatively narrow excepting adjacent said intermediate bend or outward curve, where they are wider, having their narrow edge sloping at an angle to said intermediate bend, said vertical and horizontal flanges at the rear ends of said side bars converging together into a solid downwardly-curved spring-support, and at their forward ends converging together into an integral transverse spring-support.

6. An automobile-frame, having opposite side bars, each containing a vertical flange and horizontal edge flanges, said vertical flange increasing in thickness toward the intermediate length of the side bar, opposite cross-rails adjacent the opposite ends of said side bars, cast integrally therewith and having gussets cast integrally with said horizontal edge flanges of the side bars, an intermediate cross-rail also cast integrally with said side bars and having similarly cast integral gussets, and longitudinally-depending subframe-rails cast integrally with said intermediate cross-rail and the forward cross-rail.

7. An automobile-frame, having opposite side bars, each containing a vertical flange and horizontal edge flanges, said vertical flange increasing in thickness toward the intermediate length of the side bars, opposite cross-rails U-shaped in cross-section adjacent the opposite ends of said side bar, cast integrally therewith and having gussets cast integrally with said horizontal edge flanges of the side bars, an intermediate cross-rail also cast integrally with said side bars and having similarly cast integral gussets and being U-shaped in cross-section, and longitudinally-depending subframe-rails cast integrally with said intermediate cross-rail and the forward cross-rail, said subframe-rails at their opposite ends having lateral strengthening-bosses connecting integrally with the upper and lower flanges of said cross-rails.

8. An automobile-frame, having opposite side bars, each containing a vertical flange and horizontal edge flanges, said vertical flange increasing in thickness toward the intermediate length of the side bars, opposite cross-rails U-shaped in cross-section adjacent the opposite ends of said side bar, cast integrally therewith and having gussets cast integrally with said horizontal edge flanges of the side bars, an intermediate cross-rail also cast integrally with said side bars and having similarly cast integral gussets and being U-shaped in cross-section, and longitudinally-depending subframe-rails cast integrally with said intermediate cross-rail and the forward cross-rail, said subframe-rails at their opposite ends having lateral strengthening-bosses connecting integrally with the upper and lower flanges of said cross-rails, said side bars having integrally-cast spring-bosses adjacent said thickened portion of said vertical flange, and integrally-cast bosses for the rear brake-shaft bearing, adjacent the rear spring-bosses and connected thereto by obliquely-extending integral webs.

9. An automobile-frame, having opposite side bars, each containing a vertical flange and horizontal edge flanges, said vertical flange increasing in thickness toward the intermediate length of said bar, opposite cross-rails adjacent the opposite ends of said side bars, having integral gussets extending diagonally of said side bars to coöperate with said edge flanges, an intermediate cross-rail having similar gussets coöperating with said side bars, and longitudinally-depending subframe-rails extending between said intermediate cross-rail and the forward cross-rail.

In testimony whereof I have signed my name to this specification in the presence of two subscribing witnesses.

ALFRED B. MORSE.

Witnesses:
CHESTER T. BATES,
GEO. H. MAXWELL.